Dec. 19, 1961  C. D. JOSLIN  3,013,787
UNIVERSAL MOUNTING FOR A CUTTING TORCH
Filed May 25, 1960  2 Sheets-Sheet 1
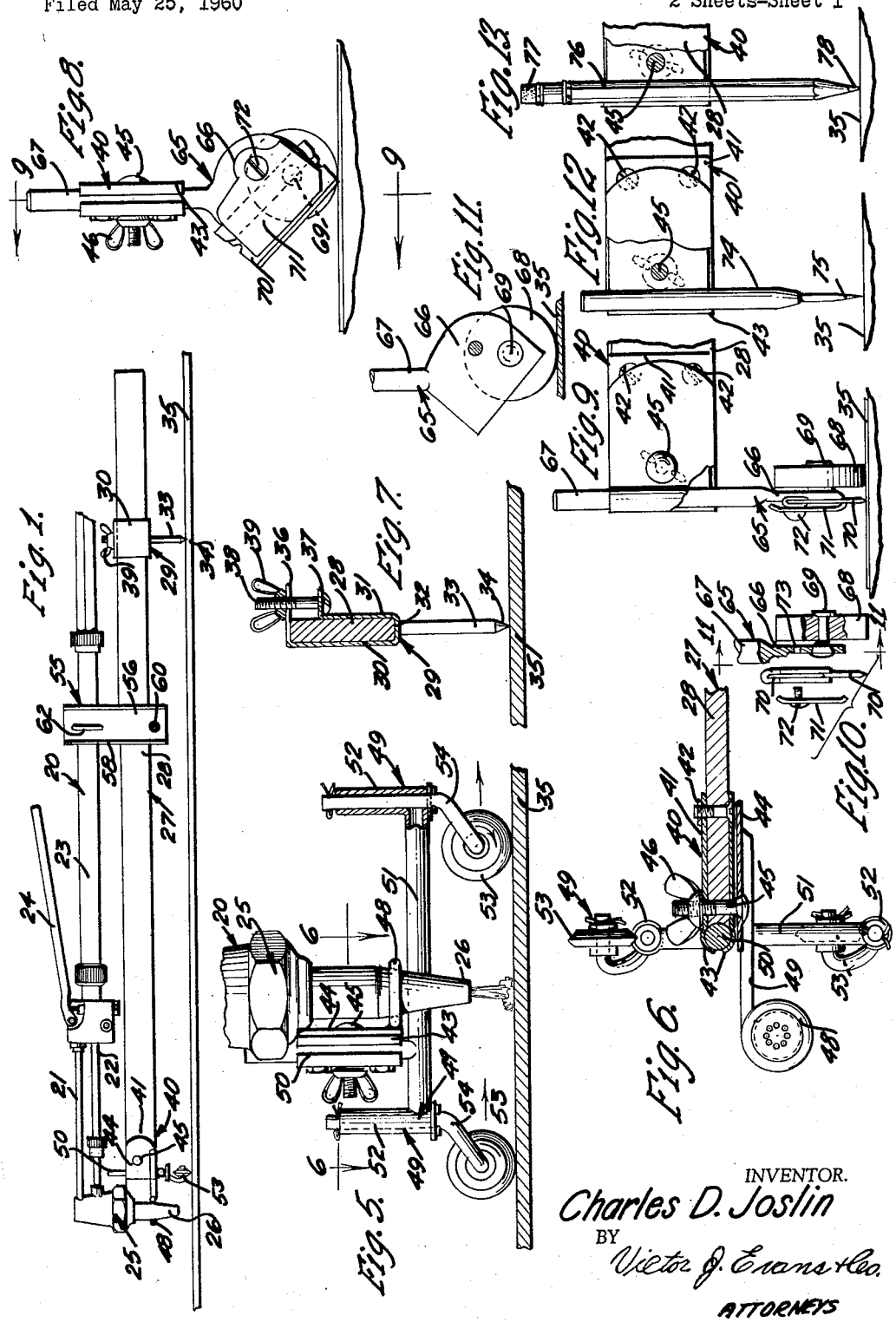
INVENTOR.
Charles D. Joslin
BY
Victor J. Evans & Co.
ATTORNEYS

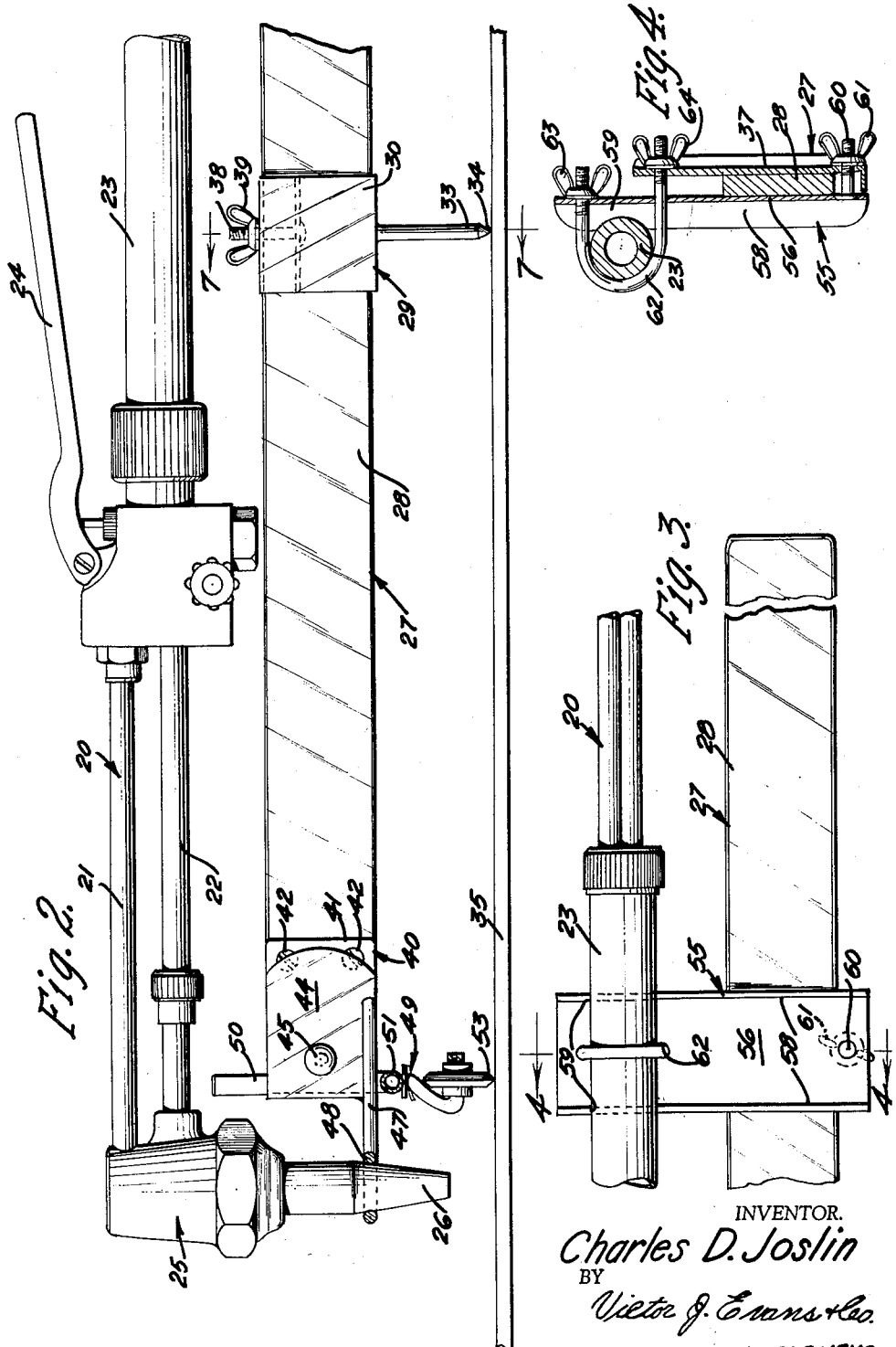

3,013,787
Patented Dec. 19, 1961

3,013,787
UNIVERSAL MOUNTING FOR A CUTTING TORCH
Charles D. Joslin, 2208 N. 8th Ave., Texas City, Tex.
Filed May 25, 1960, Ser. No. 31,657
3 Claims. (Cl. 266—23)

This invention relates to a cutting torch, and more particularly to an attachment for a cutting torch which will permit the torch to be swung in order to describe a circle, and wherein the cutting tip of the torch can be conveniently held at different angles as desired.

An important object of the present invention is to provide an accessory or mounting for a cutting torch wherein different types of tools such as gasket cutters, steel circle cutters, a scribe, pencil, rule pin or the like can be used thereon.

Another object of the invention is to provide an accessory for a cutting torch wherein there is provided a novel means for attaching the cutting torch to the accessory or mounting of the present invention, and wherein different types of members can be used with the present invention as desired so that a plurality of different types of work can be conveniently carried out.

A further object of the invention is to provide a universal mounting for a cutting torch which is extremely simple and inexpensive to manufacture.

Other objects and advantages will be apparent during the course of the following description.

In the accompanying drawings, forming a part of this application and in which like numerals are used to designate like parts throughout the same.

FIGURE 1 is a side elevational view illustrating the attachment of the present invention being used with a cutting torch.

FIGURE 2 is an enlarged side elevational view showing the front portion of the present invention.

FIGURE 3 is an enlarged elevational view showing the rear portion of the present invention.

FIGURE 4 is a sectional view taken on the line 4—4 of FIGURE 3.

FIGURE 5 is a front elevational view illustrating the present invention.

FIGURE 6 is a sectional view taken on the line 6—6 of FIGURE 5.

FIGURE 7 is a sectional view taken on the line 7—7 of FIGURE 2.

FIGURE 8 is a front elevational view illustrating a modification.

FIGURE 9 is a sectional view taken on the line 9—9 of FIGURE 8.

FIGURE 10 is a fragmentary sectional view illustrating the parts of the assembly of FIGURES 8 and 9 in separated or disassembled relation.

FIGURE 11 is a sectional view taken on the line 11—11 of FIGURE 10.

FIGURE 12 is a fragmentary elevational view similar to FIGURE 9 but showing another modification wherein a scriber is used instead of the device of FIGURE 9.

FIGURE 13 is a fragmentary elevational view similar to FIGURE 12 but showing a pencil being supported instead of the scriber.

Referring in detail to the drawings, the numeral 20 indicates a conventional cutting torch which includes the usual tubes 21 and 22 as well as a handle 23 and a control member 24 as well as a head 25 which has a depending tip 26.

According to the present invention there is provided an attachment or accessory which is indicated generally by the numeral 27, and the attachment 27 includes a horizontally disposed bar 28.

The numeral 29 indicates a support member which is adjustably connected to the bar 28, and as shown in FIGURE 7 for example the support member 29 includes vertically disposed spaced parallel first and second portions 30 and 31 which have their lower ends connected by a horizontally disposed bottom portion 32. The numeral 33 indicates a pin which depends from the bottom portion 32 and which is secured thereto or formed integral therewith, and the pin 33 is provided with a lower pointed end 34 for engagement with a workpiece such as the workpiece 35. The support member 29 further includes horizontally disposed spaced parallel flanges 36 and 37, and the numeral 38 indicates a securing element or bolt which extends through these flanges and there is provided a fastener such as the wing nut 39 which is arranged in threaded engagement with the upper end of the bolt 38.

As shown in the drawings, there is provided a bracket 40 on an end of the bar 28, and the bracket 40 includes a pair of vertically disposed spaced apart side members 41 which are connected to an end portion of the bar 28 as for example by means of securing elements 42. The side members 41 include portions 43 which are shaped arcuately or curved and which project outwardly beyond the bar 28, for a purpose to be later described. The numeral 44 indicates a plate which is pivotally connected to the bracket 40, as for example by means of a securing element or bolt 45, and a wing nut 46 is arranged in threaded engagement with the bolt 45. A finger 47 is secured to or formed integral with the plate 44, and the finger 47 is provided with a looped or coiled portion 48, FIGURE 6.

The looped portion 48 is adapted to have the tip 26 of the torch projecting therethrough, as for example when the parts are in the position of FIGURE 2.

There is further provided a steady rest which is indicated generally by the numeral 49, and as shown in FIGURE 5 for example the steady rest 49 includes an upstanding vertically disposed pin or rod 50 which is positioned between the projecting portions 43 of the side member 41, FIGURES 5 and 6. The steady rest 49 further includes a horizontally disposed crosspiece 51 which extends between a pair of vertically disposed sleeves or collars 52, and the lower end of the rod 50 is secured to or formed integral with the crosspiece 51. Wheels or rollers 53 have stems or shanks 54 journaled in the sleeves 52.

As shown in FIGURE 4 for example there is provided a clamp which is indicated generally by the numeral 55, and the clamp 55 includes a vertically disposed base or support piece 56, and the numeral 57 indicates a saddle, the saddle 57 being arranged on the opposite side of the bar 28 from the base 56. The base 56 is provided with ribs or flanges 58 which are recessed as at 59 so as to snugly receive therein a portion of the handle 23 of the torch 20. A securing element 60 connects the members 56 and 57 together, and a wing nut 61 is arranged in threaded engagement with the securing element 60. The numeral 62 indicates a retainer or bolt which has a generally U-shape or U-formation, and the bolt 62 has threaded ends on which are arranged fasteners such as the wing nuts 63 and 64, and a portion of the bolt 62 straddles the handle 23 of the torch.

Referring now to FIGURES 8 through 11 of the drawings, the numeral 65 indicates a modification or different type of accessory which is adapted to be used instead of the steady rest 49, and when the attachment 65 is being used, the torch 20 may be disconnected. The attachment 65 includes a lower generally flattened section 66 which has an upstanding stem 67 secured thereto or formed integral therewith, and the stem 67 is adapted to be positioned between the arcuate projecting portions 43 of the side members 41, as for example as shown in FIGURE 8.

The numeral 68 indicates a roller or wheel which is journaled or rotatably connected to the section 66 as for example by means of a shaft or axle 69. A cutter or blade which may be similar to a razor blade is indicated by the numeral 70 is arranged contiguous to the section 66, and a retainer 71 is provided for maintaining the cutter 70 in its proper position, there being a securing element or screw 72 extending through the retainer 71 and into engagement with a threaded aperture 73 in section 66.

In FIGURE 12 there is illustrated a further modification wherein the numeral 74 indicates a scriber which has its upper portion clamped between the portions 43, and the scriber 74 is provided with a lower pointed tip 75. In FIGURE 13 an alternative arrangement is illustrated wherein the numeral 76 indicates a pencil or marking member which may be held between the portions 43, and the member 76 is of the type that includes an eraser 77 on one end as well as a writing point 78 on the lower end thereof.

From the foregoing, it is apparent that there had been provided an accessory or attachment or tool which is especially suitable for use with a cutting torch such as the torch 20. With the parts arranged as shown in FIGURES 1 through 7 for example, it will be seen that the torch 20 and accessory 27 are adapted to be connected together as previously described. The support member 29 is connected to the bar 28 as shown in FIGURE 7 for example, and by loosening the wing nut 39 the support member 29 can be shifted along the bar 28 to the desired location, and then the wing nut 39 can be tightened on the bolt 38 in order to exert sufficient pressure by the support member 29 on the bar 28 so as to maintain the support member immobile in its desired adjusted position. The pin 33 depends from the support member 29 and has the pointed lower end 34 for engaging the work piece 35 and the pin 36 functions as a centering pin whereby the end portion of the apparatus as shown on the left side of FIGURE 1 for example, can describe a circle about the pin 33.

The torch 20 is of conventional construction and the torch 20 is adapted to be connected to the bar 28 as for example by means of the clamp 55. Thus, as shown in FIGURE 4 for example the clamp 55 includes the flanges 58 on the member 56 which are recessed as at 59 so that a portion of the handle 23 can be snugly received in the recessed portions 59 and the bolt or fastener 62 straddles the handle 23 and has the wing nuts 63 and 64 on its ends. One end of the bolt 62 engages the member 57, and the bolt 60 serves to connect the lower ends of the members 56 and 57 together, and the wing nut 61 is arranged in threaded engagement with the bolt 60. Thus, by disengaging the fasteners such as the wing nut 63, 64 and 61, the clamp 55 can be disassembled as for example when the torch 20 is to be disconnected from the accessory 27.

The torch 20 includes the head 25 which is provided with the usual tip 26, and as shown in FIGURE 2 for example the tip 26 projects through the loop 48 of the finger 47, the finger 47 being secured as by welding to the plate 44, and the plate 44 is pivotally connected to the bracket 40 as for example by means of the pin or bolt 45. When the plate 44 is to be adjusted or pivoted, the wing nut 46 is loosened and then the plate 44 can be pivoted to the desired angularly position and then the nut 46 is tightened in order to maintain the parts such as the plate 44 and finger 47 and loop 48 in the desired angular position whereby the tip 26 can then be supported in the desired location or angle as desired.

The steady rest 49 is shaped to include the upstanding rod 50 which is mounted between the projecting curved portion 43 of the bracket 40 so that a movable support is provided for the end portion of the device. The steady rest 49 also includes the casters or wheels 53 which are journaled in the sleeves 52 as at 54, and this arrangement serves to insure that as the accessory pivots about the pivot pin or centering pin 33, the wheels 53 can move to the desired position in order to permit the desired proper movement of the parts. The wing nut 46 can also be loosened or tightened in order to vary the clamping effect of the portions 43 on a member such as the rods 50. Thus, by loosening the wing nut 46, the rod 50 can be readily disengaged or removed from the device when desired.

The present invention is also adapted to be used in different manners as for example as shown in FIGURES 8 through 11, the accessory 27 can be used without the torch 20 and without the steady rest 49. Thus, in FIGURES 8 through 11 an attachment 65 is adapted to be used so that a work piece such as the workpiece 35 can be cut as for example by means of a blade or cutter 70. Thus, when using the device shown in FIGURES through 11, the rod 67 is positioned between the portions 43 and the nut 46 is tightened in order to maintain the rod therein and the lower end of the rod 67 has the flat portion 66, and the roller 68 is rotatably connected to the portion 66 as for example by means of the axle 69. The blade 70 is maintained connected to the portions or section 66 as for example by means of the cover 71 which is held in place by the securing element 72, and it is to be understood that the device 65 is adapted to be mounted on an end of the bar 28, and the pin 33 will again function as the centering pin. Thus, by rotating the bar 28 with the attachment 65 thereon, a circular cut or opening can be formed in a workpiece such as the work piece 65 due to the position of the blade 70, and the roller 68 will provide a means for supporting the device in such a manner that the device can readily travel around the workpiece during the cutting operation.

In the modification of FIGURE 12, the scriber 74 is clampingly held between the portions 43 and the scriber 74 has the lower pointed end 75. Thus, with the scriber 74 mounted on the bracket end of the bar 28, the bar 28 can be pivoted or rotated about the centering pin 33 so that the scriber 74 can be used for marking or ruling a circle on a member such as the work piece 35. In FIGURE 13 the portions 43 are shown being used for clamping a pencil 76 therebetween, so that by rotating the bar 28 in the previously described fashion, the pencil point 78 can be used to describe a circle thereon.

The parts can be made of any suitable material and in different shapes or sizes.

The present invention thus provides a universal mounting for a cutting torch such as the torch 20, and also the device can be used in other fashions as for example it can be used as a gasket cutter for example when the parts are arranged as shown in FIGURES 8 through 11. The steady rest 49 utilizes a three point suspension and wherein there is provided on the steady rest the pair of wheels 53. These wheels 53 may be provided with flat peripheral surfaces, or else they may be provided with pointed or tapered outer peripheries. If desired a shim may be positioned between the handle 23 and the flanges 58. The cost of the accessory is very low and the device is capable of being used in a plurality of different manners. The device can thus be used as a combination circle cutter, gasket cutter, and wherein it can also be used as a scribe and for holding a lead pencil or rule pin. The device shown in FIGURE 8 is adapted to be used as a gasket cutter. The position of the member such as the U-bolt 62 in FIGURE 4 serves to insure that the device will accommodate or fit torch handles of different shapes or sizes. The eye or loop 48 serves to hold or engage the cutting tip 26 of the torch. The steady rest serves to hold the cutting tip steady and at the right elevation or location. The clamp 55 can be adjusted to different positions on the bar 28 and then due to the position of the wing nuts this clamp will be maintained stationary in its desired location. The position of the adjustable plate 44 permits the cutting tip to be held at the proper elevation and serves to insure that a clean cut may be made and also facilitates the work of the user or operator. The eye 48 can be made smaller or larger so as to fit cutting tips of different sizes or shapes. The gasket cutter as for example as shown in FIGURE 8 is constructed so that the cutting edge will be held at the proper elevation, and will be less chance for the knife 70 to break or become damaged, since the operator will have a tendency to press down on the cutter and the wheel 68 will take care of excess pressure and will also help hold the material from slipping on the table. Heretofore when cutting gaskets it has been the practice to hold or tack the material to a table, but with the present invention this work is greatly simplified and speeded up. The steel scribe 74 can be used for lay-out work, and the pencil 76 can be used for marking on wood, paper or the like. The parts such as the point 33 are adapted to be made of a suitable material such as stainless steel.

Minor changes in shape, size and rearrangement of details coming within the field of invention claimed, may be resorted to in actual practice, if desired.

What is claimed is:

1. In an attachment for a cutting torch of the type that includes a handle, a head and a tip depending from said head, said attachment comprising an elongated bar, a support member connected to said bar and including vertically disposed spaced parallel first and second portions arranged on opposite sides of said bar, said support member further including a bottom portion arranged below said bar and horizontally disposed spaced parallel flanges, a securing element extending between said flanges, a pointed pin depending from the bottom portion of said support member; a bracket including a pair of spaced apart side members affixed to an end of said bar and said side members including arcuate projecting end portions, a plate pivotally connected to said bracket, a finger operatively connected to said plate and said finger being provided with an eye for the projection therethrough of the tip of the head; a steady rest comprising a vertically disposed rod extending between the projecting end portions of said side members, a horizontally disposed crosspiece affixed to the lower end of said rod, spaced parallel vertically disposed hollow cylindrical sleeves on the ends of the crosspiece, and a plurality of wheels each having stems mounted in said sleeves.

2. In an attachment for a cutting torch of the type that includes a handle, a head and a tip depending from said head, said attachment embodying an elongated bar that is horizontally disposed, a support member operatively affixed to said bar and including vertically disposed spaced parallel first and second portions arranged on opposite sides of said bar, said support member further including a bottom portion arranged below said bar and horizontally disposed spaced parallel flanges, a securing element extending between said flanges, a pointed pin depending from the bottom portion of said support member; a bracket embodying a pair of spaced apart side members that are vertically disposed and said side members being operatively connected to an end of said bar and said side members embodying arcuate end portions that project outwardly beyond said bar, a plate pivotally connected to said bracket, a finger secured to said plate and said finger being provided with an eye for the projection therethrough of the tip of the head; a steady rest comprising a vertically disposed rod extending between the projecting end portions of said side members, a horizontally disposed crosspiece affixed to the lower end of said rod, spaced parallel vertically disposed hollow cylindrical sleeves on the ends of the crosspiece, and wheels having stems mounted in said sleeves, a clamp including vertically disposed members arranged on opposite sides of said bar, securing elements connecting the members of said clamp together, one of said members being provided with flanges having recesses for receiving a portion of the handle of the cutting torch.

3. In a device of the character described, an elongated bar, a support member operatively affixed to said bar and said support member embodying vertically disposed spaced parallel first and second portions arranged on opposite sides of said bar, said support member further including a bottom portion arranged below said bar, horizontally disposed spaced parallel flanges on said support member, a securing element extending between said flanges, a pointed pin depending from the bottom portion of said support member; a bracket including a pair of spaced apart side members operatively connected to an end of said bar and said side members including arcuate projecting end portions, a plate pivotally connected to said bracket, a finger affixed to said plate and said finger being provided with an eye, a steady rest comprising vertically disposed rods extending between the projecting end portions of said plate, a horizontally disposed crosspiece affixed to the lower end of said rod, spaced parallel vertically disposed sleeves on the ends of said crosspiece, wheels having stems mounted in said sleeves, a clamp including members arranged on opposite sides of said bar, and securing elements connecting said last named members together.

References Cited in the file of this patent

UNITED STATES PATENTS

| | | |
|---|---|---|
| 1,780,814 | Cregger | Nov. 4, 1930 |
| 2,323,298 | Cook | July 6, 1943 |
| 2,483,294 | Miner | Sept. 27, 1949 |
| 2,603,475 | Rotsch | July 15, 1952 |
| 2,852,245 | Lamb | Sept. 16, 1958 |